United States Patent [19]

Kajikawa

[11] Patent Number: 4,653,296
[45] Date of Patent: Mar. 31, 1987

[54] HANDLE LOCKING MECHANISM FOR VEHICLES

[75] Inventor: Tsuneo Kajikawa, Kamifukuoka, Japan

[73] Assignee: Honda Giken Kogyo Kabushiki Kaisha, Tokyo, Japan

[21] Appl. No.: 857,017

[22] Filed: Apr. 29, 1986

[30] Foreign Application Priority Data

May 23, 1985 [JP] Japan ................... 60-110647

[51] Int. Cl.[4] ............................................. B62H 5/06
[52] U.S. Cl. .................................... 70/185; 70/233; 70/59
[58] Field of Search ............... 70/59, 182, 183, 184, 70/185, 186, 187, 207, 209, 210, 211, 233, 253, 256

[56] References Cited

U.S. PATENT DOCUMENTS

| | | | |
|---|---|---|---|
| 2,055,149 | 9/1936 | Hershbain | 70/233 |
| 2,576,773 | 11/1951 | Buxton | 70/233 |
| 4,201,398 | 5/1980 | Meier | 70/59 |
| 4,232,537 | 11/1980 | Plaiss | 70/233 |
| 4,509,349 | 4/1985 | Partridge | 70/233 |

*Primary Examiner*—Robert L. Wolfe
*Attorney, Agent, or Firm*—Armstrong, Nikaido, Marmelstein & Kubovcik

[57] ABSTRACT

Key operating means and locking means are separately provided. The key operating means is provided on the upper portion of a steering shaft, while the locking means is mounted on the lower portion of the steering shaft. Both means are connected to each other by way of a control wire. A cylinder of the key operating means is rotated by a key to engage or disengage a locking pin of the locking means with or out of an engaging member formed on a body frame, whereby locking or releasing is achieved.

2 Claims, 8 Drawing Figures

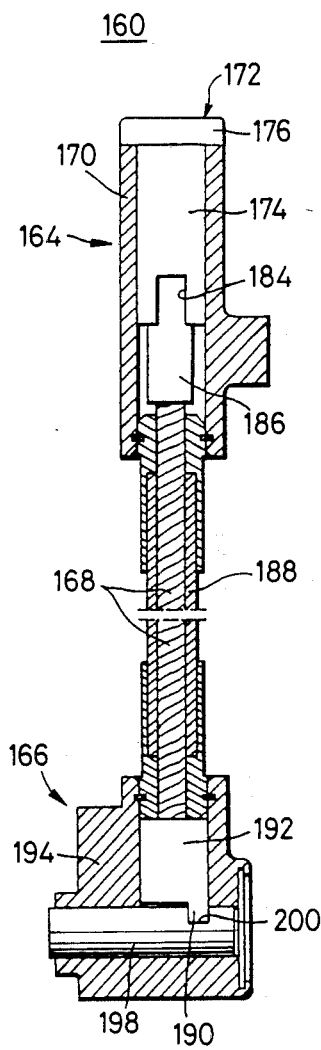
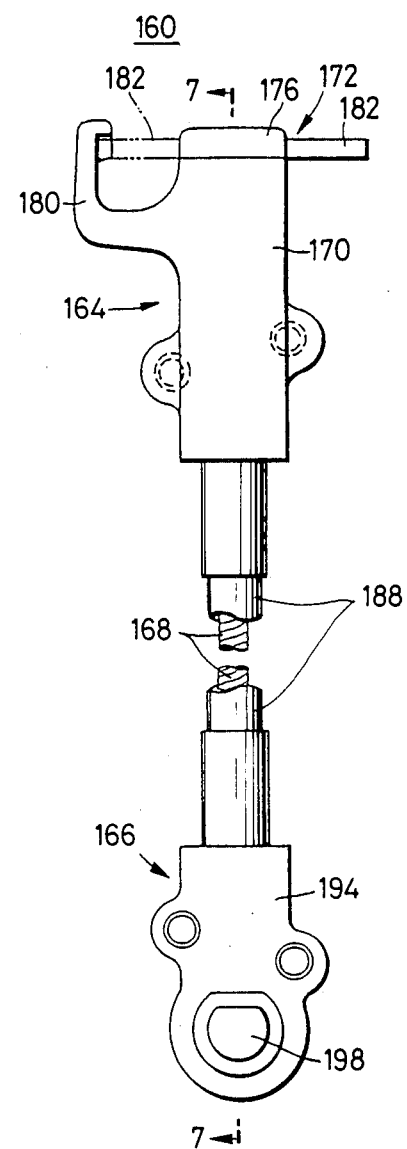
FIG. 7
FIG. 6

HANDLE LOCKING MECHANISM FOR VEHICLES

FIELD OF THE INVENTION AND RELATED ART STATEMENT

The present invention relates to a handle locking mechanism for vehicles and, more particularly, to a handle locking mechanism for four-wheeled buggies.

As illustrated in, for instance, Japanese Utility Model Kokai-Publication No. 56-73694, a conventional buggy includes a body frame, front and rear wheels mounted thereon, fenders serving to cover the front and rear wheels, a front cover serving to cover the front portin of a vehicle body and a handle bar mounted on the front portion of the vehicle body for steering the front wheels by way of a steering shaft extending through the front cover.

However, such a buggy has not been provided with any handle locking means. This appears to be due to the fact that, when the steering shaft is locked in place with the frame being fixed in the case of a buggy, any handle locking means may only be located at a position where dusting is easy to occur in view of design and structural limitations.

OBJECT AND SUMMARY OF THE INVENTION

The present invention has been accomplished in view of the foregoing background, and has for its primary object to provide an handle locking mechanism for vehicles such as four-wheeled buggies, in which key operating means and locking means are separately provided, and connection is made therebetween by way of a control wire to easily remote-control the locking means from an accessible position, and which assures improved manipulation and prevents dust, etc. from being deposited to the key operating means.

A second object of the present invention is to lock a helmet on a body of the key operating means in operative association with the key operation for handle locking.

More specifically, the present invention provides a handle locking mechanism for a vehicle including a body frame, front and rear wheels mounted thereon, fenders adapted to cover said front and rear wheels, a front cover adapted to cover the front portion of a vehicle biody, and a handle bar attached to the front portion of a vehicle body, through a steering shaft for steering said front wheels, which is characterized in that key operating means having a cylinder rotatable by key operation is fixedly provided on the upper portion of said steering shaft projecting from said front cover, locking means having a projectable locking pin is fixedly provided on the lower portion of said steering shaft covered with said front cover, a control wire is provided for connecting together said key operating means and said locking means to make it possible to manipulate said locking pin of said locking means by rotation of said cylinder, and an engaging member for engagement with said locking pin is provided on said body frame.

In accordance with the arrangement as mentioned above, when the handle bar is located in the straightforward direction to rotate the cylinder of the key operating means by a key, the rotational movement of the cylinder acts upon the locking pin of the locking means through the control wire, whereby said locking pin is engaged or disengaged with or out of the engaging member provided on the body frame.

Many advantages, features and additional objects of the present invention will become apparent to those versed in the art upon making reference to the detailed description and the accompanying sheet of the drawings on which preferred embodiments incorporating the principles of the invention are shown by way of illustration example.

BRIEF DESCRIPTION OF THE DRAWINGS

FIG. 6 is a front view showing the handle locking mechanism, FIG. 7 is a sectional view taken along the line 7—7 of FIG. 6.

DETAILED DESCRIPTION OF PREFERRED EMBODIMENTS

One embodiment wherein the present invention is applied to a four-wheeled buggy will now be explained with reference to the drawings.

Figure 1:
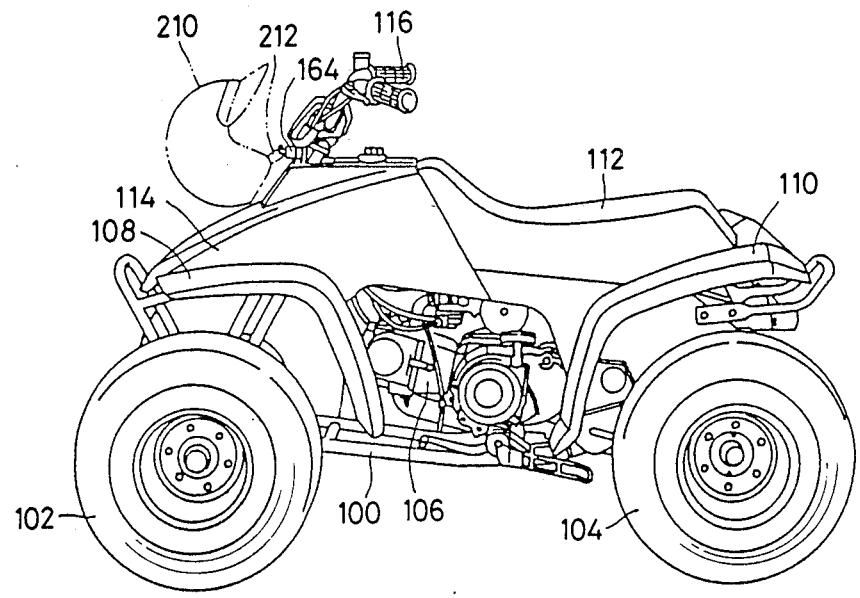
FIG. 1 is a general side view showing a buggy into which the present invention is incorporated.
Figure 2:
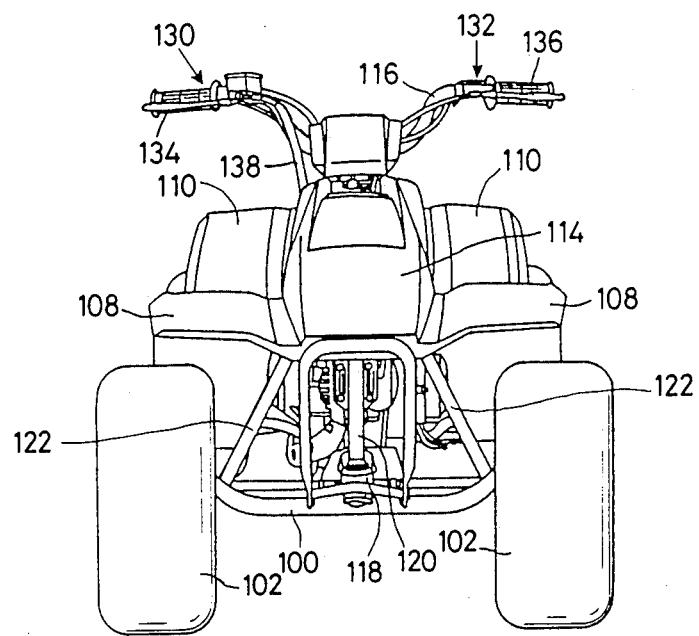
FIG. 2 is a side view of that buggy.

Referring first to FIGS. 1 and 2, a body frame generally shown at 100 includes two sets of front wheels 102 and rear wheels 104. The rear wheels 104 are driven by an engine 106 mounted on the body frame 100. The front and rear wheels 102 and 104 are then covered with front and rear fenders 108 and 110. There is arranged a seat 112 above between both fenders 108 and 110. The front portion of the body in front of the seat 112 is covered with a front cover 114 integral with the front fender 108. In front of the body, there is a handle bar 116 having its central portion connected with a steering shaft 120 at the upper end thereof, said steering shaft being pivotally supported at the lower end thereeof on a bearing 118 fixed to the body frame 100. Manipulation of the steering shaft 116 causes steering of the front wheels 102.

Figure 3:
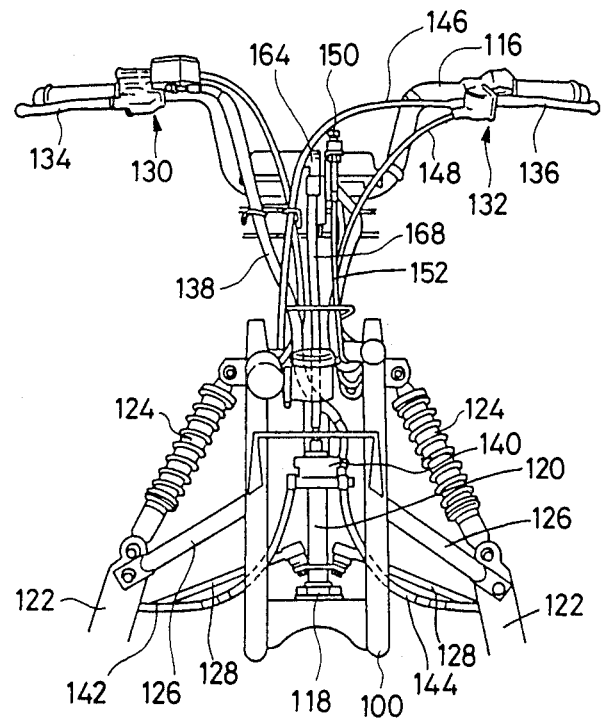
FIG. 3 is a front view showing part of that buggy from which a front fender and a front cover have been removed.
Figure 5:
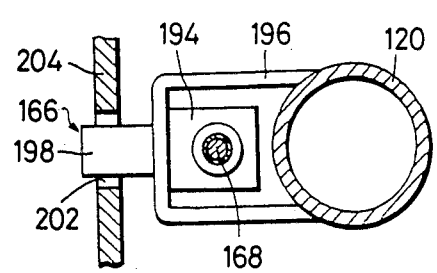
FIG. 5 is a sectional view taken along the line 5—5 of FIG. 4.

Referring to FIG. 3, reference numerals 122 and 122 stand for knuckle holders, the upper end portions of which are joined to the upper portion of the front body frame 100 by way of the associated suspensions 124 and 124, and are connected to the intermediate portion of the front body frame portion 100 by way of the associated arms 126 and 126. Reference numerals 128 and 128 denote a pair of tie rods.

The handle bar 116 for effecting pivotal movement of the steering shaft 120 is provided with a hydraulic type of front braking means 130 and a mechanical type of rear braking means 132. Levers 134 and 136 for operating the braking means 130 and 132, respectively, are provided. A front brake hose 138 is connected to the front braking means 130, and then to right-hand and left-hand front brake hoses 142 and 144 by way of a brake fluid distributor 140 attached to the body 100. The rear braking means 132 is also connected with a rear brake cable 146 and a reverse selector cable 148. In the rear of a handle cover 149 covering the central front portion of the handle bar 116, there is a choke lever 150, which is connected with a choke cable 152. The aforesaid front brake holes 138, rear brake cable 146, reverse selector cable 148 and choke cable 152 are arranged along the steering shaft 120 from bove to below in front of said shaft 120.

A handle locking mechanism 160 is disposed in front of the steering shaft 120, and includes a key-operating means 164 attached to a stay 162 secured to the upper portion of the steering shaft 120 projecting from the front cover 114, a locking means 166 attached to the lower portion of the steering shaft 120 covered with the front cover 140, and a control wire 168 for connecting together both means 164 and 166.

Figure 8:
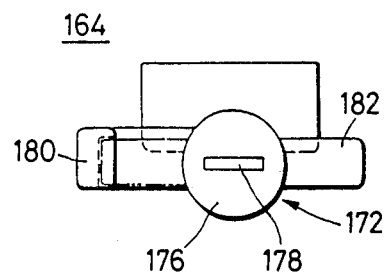
FIG. 8 is a plan view showing that mechanism.
Figure 4:
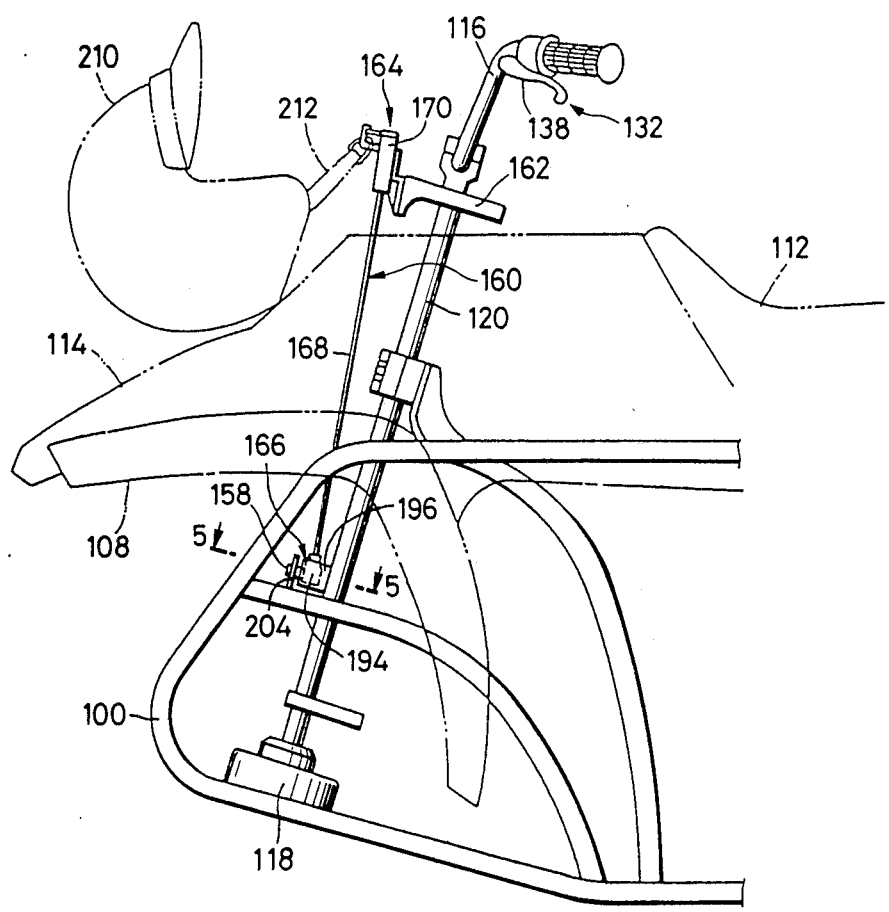
FIG. 4 is an enlarged view showing the front portion of a buggy for illustrating the attachment of the handle locking mechanism according to the present invention.

As illustrated in FIGS. 6 to 8, the key-operating means 164 includes a body 170 secured to the aforesaid stay 162 and a cylinder 172 inserted into said body 170. That cylinder 172 is comprised of a barrel portion 174 inserted into the body 170 and an operable portion 176 projecting from the upper portion of the cylinder 172. The operable portion 176 is provided therein with a key hole 178 on the upper face of the operable portion 176. The body 170 is provided as one integral piece with a hooked helmet hanger 180 which projects in front of the body, and is open at the upper portion thereof. On the other hand, the operable portion 176 is provided on the side with means 182 which is rotatable with the operable portion 176, when the cylinder 172 is rotated, and serves to close up the upper opening of the helmet hanger 180.

The barrel portion of the cylinder 172 is provided with a slit 184 on the lower portion thereof, into which fittings 186 attached to the upper end of a control wire 168 is fitted. The control wire 168 is flexible, and is arranged along the front portion of the steering shaft 120 together with the front brake hole 138, rear brake cable 146, reverse selector cable 148 and choke cable 152. The control wire 168 is also provided at the lower end with a drum 192 including a protrusion 190 at an eccentric position of the leading end thereof. That drum 192 is rotatably inserted into a body 194 of the locking means 166.

Said locking means 166 includes a body 194 secured to the lower front portion of the steering shaft 120 through a bracket 196 and a locking pin 198 which is inserted into said body 194, is movable in the to-and-fro direction of the vehicle body, and has a projectable leading end. The locking pin 198 is provided with a groove 200 on the upper face thereof, into which the protrusion 190 of the drum 192 formed at the lower end of the control wire 168 is fitted, so that the rotation of the drum 195 is converted to lateral movement by engagement of the protrusion 190 within the groove 200.

In front of the locking means 166, the body frame 100 is fixedly provided with an engaging member 204 which includes an engaging hole 202 for engagement with the locking pin 198 extending from the locking means 166.

The handle locking arrangement as explained above operates as follows.

When the handle bar 116 is locked in place, the handle bar 116 is positioned in its straightforwardly moving state. The operable portion 117 of the cylinder 172 forming the key operating means 164 is then inserted into the key hole 178 formed in the operable portion 117 to turn that cylinder 172 by 180°. Thereupon, the rotation of the cylinder 172 is transmitted to the control wire 168 by way of the fittings 186 and then to the drum 192 through the control wire 168. Thus, the rotation of the drum 192 causes that the protrusion 190 formed at the eccentric position of the leading end thereof moves the locking pin 198 of the locking means 166, whereby the leading end thereof projectes from the body 194 for insertion into the engaging hole 202 in the engaging member 204 formed on the body frame 100. The handle bar 116 is locked in place in this manner to prevent it from moving in the right- and left-hand direction.

When locking of the handle bar 116 is released, on the contrary, the cylinder 172 is turned by 180° in the reverse direction. Turning movement of the cylinder 172 is transmitted to the drum 192 through paths similar to those as mentioned in the foregoing, so that the locking pin 198 of the locking means 166 is returned into the body 194 by turning of the drum 192 for disengagement of the leading end of the locking pin 198 out of the engaging hole 202 in the engaging member 204, whereby locking of the handle bar 116 is released.

During locking of the handle locking mechanism 160, if a chin strap 212 of the helmet 210 is applied over the helmet hanger 180 and the cylinder 172 is turned, then the means 182 formed on the operable portion 176 of the cylinder 172 is turned to close up the upper opening in the helmet hanger 180 and lock the helmet 210 in place. In this manner, the helmet 210 can fixedly provided on the vehicle body in operative association with the operation for handle locking.

Obviously, many modifications and variations of the present invention are possible in the light of above teachings. It is therefore to be understood that within the scope of the appended claims, the invention may be practiced otherwise than as specifically described.

I claim:

1. A handle locking mechanism for a vehicle including a body frame, front and rear wheels mounted thereon, fenders adapted to cover said front and rear wheels, a front cover adapted to cover the front portion of a vehicle body, and a handle bar attached to the front portion of a vehicle body through a steering shaft for steering said front wheels, wherein:

key operating means having a cylinder rotatable by key operation is fixedly provided on the upper portion of said steering shaft projecting from said front cover, locking means having a projectable locking pin is fixedly provided on the lower portion of said steering shaft covered with said front cover, a control wire is provided for connecting together said key operating means and said locking means to make it possible to manipulate said locking pin of said locking means by rotation of said cylinder, and a engaging member for engagement with said locking pin is provided on said body frame.

2. A handle locking mechanism as defined in claim 1, wherein a hooked helmet hanger is provided on a body of said key operating means, and means to engage said helmet hanger is provided on said cylinder of said key operating means.

* * * * *